Aug. 6, 1968  J. RODOSTA  3,395,777
AUTOMOBILE LIFT
Filed April 28, 1967  4 Sheets-Sheet 1

INVENTOR.
JOHN RODOSTA,
BY
Berman, Davidson & Berman
ATTORNEYS

Aug. 6, 1968  J. RODOSTA  3,395,777
AUTOMOBILE LIFT

Filed April 28, 1967  4 Sheets-Sheet 4

INVENTOR.
JOHN RODOSTA,
BY
Berman, Davidson & Berman
ATTORNEYS.

_United States Patent Office_

3,395,777
Patented Aug. 6, 1968

3,395,777
AUTOMOBILE LIFT
John Rodosta, 2035 Poydras St.,
New Orleans, La. 70112
Filed Apr. 28, 1967, Ser. No. 634,683
6 Claims. (Cl. 187—8.59)

ABSTRACT OF THE DISCLOSURE

A power-operated automobile lift consisting of four hollow fixed vertical corner posts with a vehicle-supporting frame slidably-connected to the posts. The posts at one end of the lift contain hydraulic cylindrers with downwardly-extensible piston rods. Aa pair of pulleys is journaled to each piston rod. Respective pairs of cables are connected to the upper portions of the cylinders and extend around said pulley, passing over additional pulleys journaled in the posts above each cylinder. One of each pair of cables extends downwardly and is connected directly to the vehicle-supporting frame. The other of the pair extends longitudinally to the corresponding post at the opposite end of the lift. The cables extend over pulleys journaled in the top ends of said last-named posts and downwardly therefrom, being connected to the vehicle-supporting frame, so that the downward extension of the piston rod simultaneously produces upward lifting force on the frame adjacent each post. The cylinders are actuated by an electric motor-driven hydraulic pump mounted on one of the posts.

---

This invention relates to automobile lift devices, and more particularly to a hydraulically-operated automobile lift assembly of the type provided with a platform slidably-engaged with upstanding posts at the corners of the assembly.

A main object of the invention is to provide a novel and improved power-operated automobile lift device which is relatively simple in construction, which is easy to control, and which provides uniform lifting force at the respective four corner portions thereof so that the platform will be maintained substantially horizontal when being elevated.

A further object of the invention is to provide an improved power-operated automobile lift device which requires relatively few parts, which is safe to use, which is durable in construction, and which is provided with means for positively locking the movable platform portion thereof when the platform is in an elevated position.

A still further object of the invention is to provide an improved power-operated automobile lift of the type actuated by hydraulic cylinders and hydraulic pump means for operating said cylinders, the device being relatively compact in size, being very economical with respect to power consumption, and having a minimum number of moving parts.

Further objects and advantages of the invention will become apparent from the following description and claims and from the accompanying drawings, wherein:

FIGURE 5 is a vertical cross-sectional view taken substantially on the line 5—5 of FIGURE 3.

FIGURE 6 is a fragmentary horizontal cross-sectional view taken substantially on the line 6—6 of FIGURE 5.

FIGURE 7 is a schematic diagram showing the hydraulic fluid circuit employed in the lift device of FIGURES 1 to 6.

Figure 1:
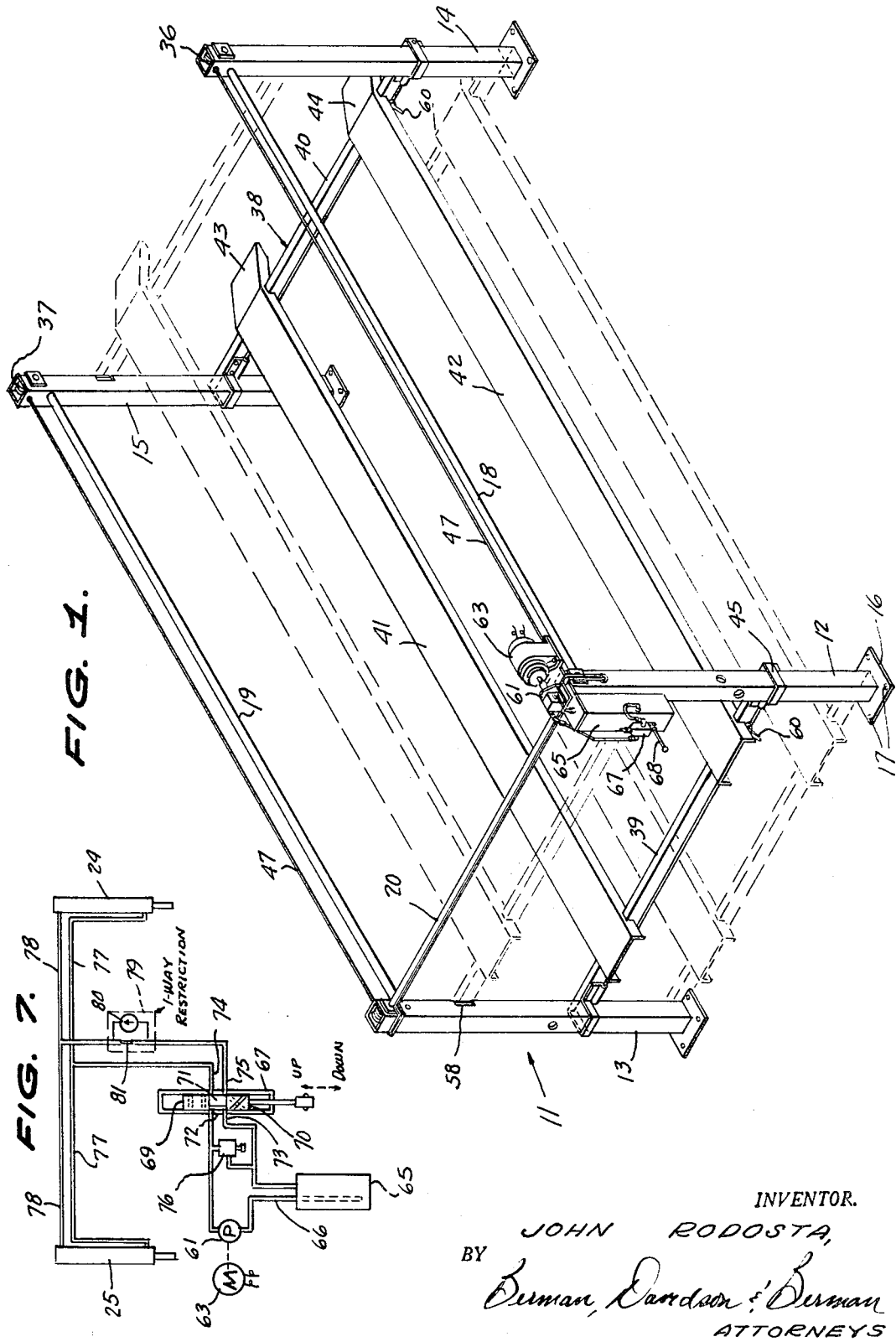
FIGURE 1 is a perspective view of a typical power-operated automobile lift assembly constructed in accordance with the present invention.

Referring to the drawings, 11 generally designates an improved power-operated automobile lift assembly constructed in accordance with the present invention. The assembly 11 comprises four hollow corner posts 12, 13, 14 and 15 which are rigidly-fixed to the floor, for example, by the provision of base flanges 16 on the posts through which anchoring bolts 17 may be engaged so as to rigidly-secure the posts in upstanding vertical positions. The posts are shown as being square in cross-section, but obviously, may have any other desired cross-sectional shape. Posts 12, 13, 14 and 15 are arranged to define a substantially rectangular enclosure with the posts 12 and 13 and the posts 14 and 15 at the opposite end thereof. The posts 14 and 12 are rigidly-connected at their top ends by a longitudinal tie rod 18 and posts 15 and 13 are similarly rigidly-connected at their top ends by another longitudinal tie rod 19. The top ends of the end posts 12 and 13 are rigidly-connected by a transverse tie rod 20. The transverse tie rod 20 comprises a hollow tube having a shaft 21 axially secured therein, as by the provision of bearing collars 22 and 23 in the opposite end portions of the tubular tie rod 20, as shown in FIGURE 3.

Figure 3:
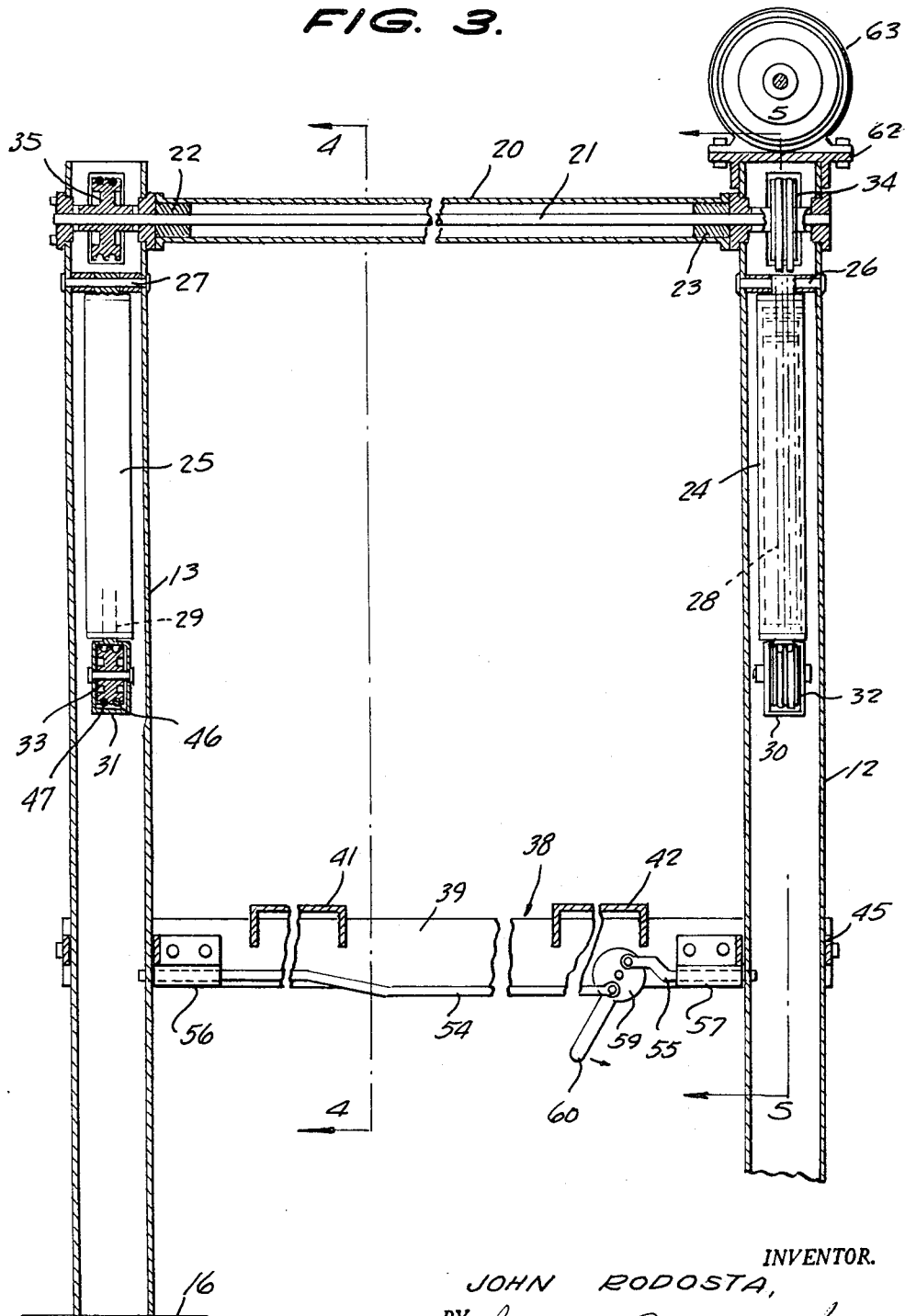
FIGURE 3 is a transverse vertical cross-sectional view taken substantially on the line 3—3 of FIGURE 2.

The posts 12 and 13 contain respective hydraulic cylinders 24 and 25, said cylinders being pivotally-connected at their top ends to the upper portions of the posts as by transverse pivot pins 26 and 27, shown in FIGURE 3. The hydraulic cylinders 24 and 25 are provided with pistons having downwardly-extending piston rods 28 and 29 to the bottom ends of which are secured respective yokes 30 and 31 in which are journaled respective double pulleys 32 and 33.

The opposite ends of the shaft 21 extend through and are supported in the top ends of the posts 12 and 13, and journaled on the end portions of the shaft 21 are respective double pulleys 34 and 35, said pulleys being located above the cylinder pivotal connections 26 and 27, as shown in FIGURE 3.

Respective single pulleys 36 and 37 are transversely journaled in the top end portions of the vertical posts 14 and 15 at the opposite end of the assembly.

Designated generally at 38 is a vehicle-supporting frame comprising respective transversely-extending crossbars 39 and 40 on which are secured the longitudinally-extending spaced, relatively wide channel bars 41 and 42 adapted to support the wheels of an automobile received on the frame 38. The tread bars 41 and 42 are, therefore, provided with inclined ramp elements 43 and 44 at their end portions adjacent the posts 14 and 15. Secured to the ends of the respective crossbars 39 and 40 are square slide brackets 45 which receive and are slidably-engaged with the respective posts, whereby to provide sliding connections of the corners of frame 38 with the upstanding vertical posts 12, 13 and 14, 15. Thus, the brackets 45 comprise respective square loops secured to the ends of the crossbars 39, 40 and slidably-receiving the posts 12, 13, 14 and 15.

Figure 4:
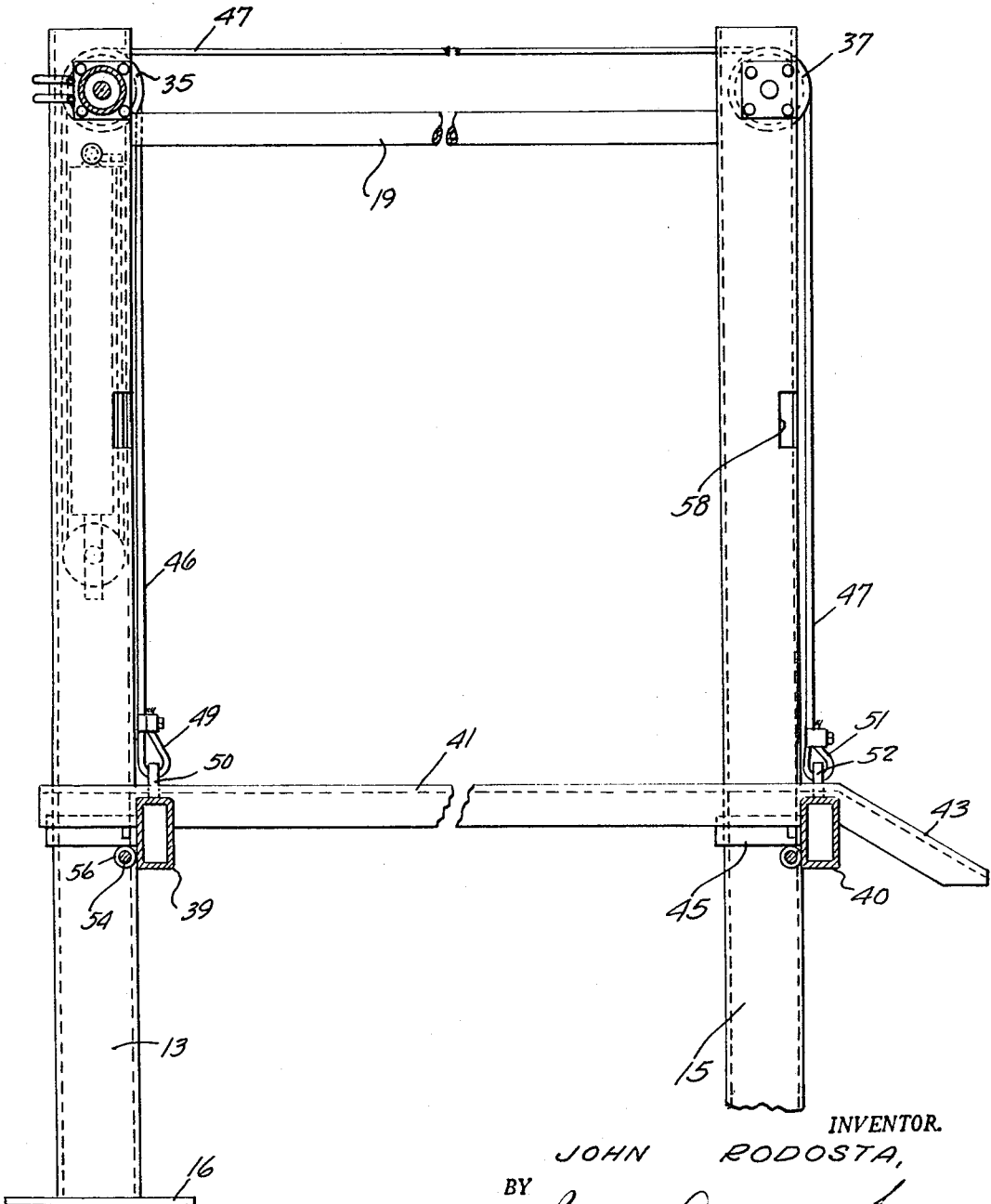
FIGURE 4 is a vertical cross-sectional view taken substantially on the line 4—4 of FIGURE 3.

Connected to the top ends of the cylinders 24 and 25 are respective pairs of cables 46 and 47 which extend downwardly around the double bottom pulleys 32, 33 and thence upwardly around the double top pulleys 34, 35. Each of the cables 46 is then directed downwardly, the free end of each cable 46 being connected, as by a loop 49, to an eye 50 provided at a respective end of crossbar 39. The other cables 47, 47 extend longitudinally adjacent the longitudinal tie bars 18, 19 and pass into the top ends of the posts 14, 15, extending over the single pulleys 36, 37, and thence downwardly. The free ends of the cables 47, 47 are formed with loops 51 which are connected to respective eye loops 52 provided on the ends of the frame crossbar 40, as shown in FIGURE 4. Thus, when the pistons in the cylinders 24 and 25 are extended downwardly from their normal positions shown in full-line view in FIGURE 3, for example, to dotted-view positions of the pulleys 32 and 33 similar to that illustrated in FIGURE 5, tension is developed in the cables 46 and 47 which is transmitted to the frame 38 at the respective corner loops 50, 52 thereof, thereby providing simultaneous lifting force at the respective corners of frame 38 which elevates the frame relative to the upstanding supporting corner posts 12, 13 and 14, 15.

The crossbars 39 and 40 are provided with respective pairs of outwardly-slidable locking bars 54 and 55, slideably-supported in respective horizontal sleeve members 56 and 57 secured to the opposite end portions of the crossbars inwardly-adjacent the hollow vertical post members 13, 12 and 15, 14, said post members being provided at their upper portions with locking apertures 58 adapted to receive the outer end portions of the locking bars 54, 55 when the bars are moved outwardly. The inner ends of the locking bars 54, 55 are respectively pivotally-secured to diametrically-opposite points on crank discs 59 rotatably mounted on the respective crossbars 39 and 40, the discs 59 having depending downwardly-extending elongated handles 60 for manually-rotating the crank discs. The vertical posts may be provided with various sets of apertures 58 located at different heights so that the frame 38 may be locked at said different heights, if so desired. As will be readily apparent from FIGURE 3, when the handle 60 is rotated in a counterclockwise direction, as viewed in FIGURE 3, the locking bars 54, 55 are retracted, releasing the frame 38. When the handle 60 is rotated in a clockwise direction, the locking bars 54, 55 are moved outwardly relative to the crank discs 59 and can be thus moved into locking engagement with the locking apertures 58 provided in the vertical post members.

Figure 2:
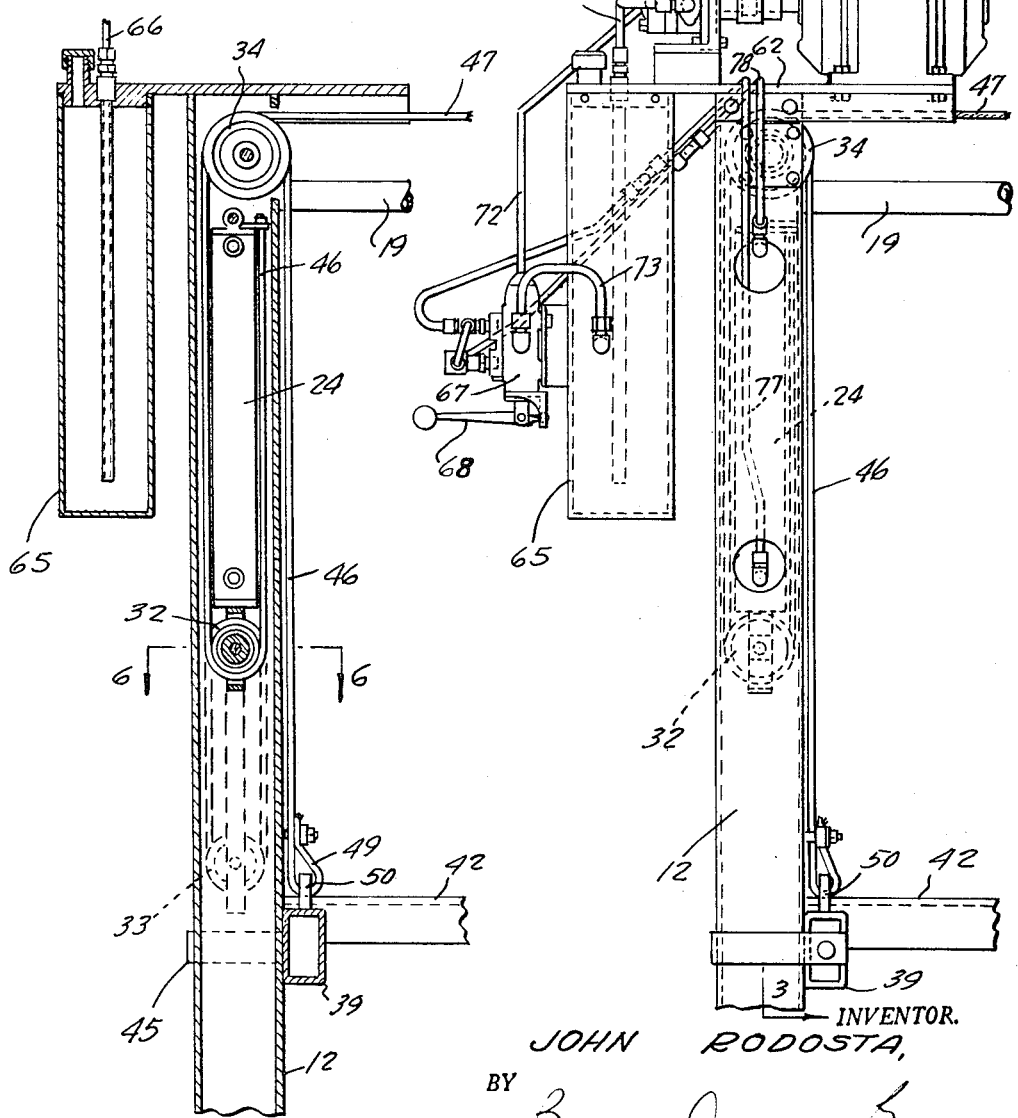
FIGURE 2 is an enlarged fragmentary side elevational view of the corner portion of the lift device of FIGURE 1 containing the electric motor-driven hydraulic pump assembly associated with the device.

As shown in FIGURE 1, the power means for raising and lowering the frame 38 is mounted on the top end portion of the vertical post member 12. Said power means comprises a generally conventional hydraulic pump 61 mounted on a horizontal plate member 62 rigidly-secured on the top end of vertical post member 12. Also secured on plate member 62 is an electric motor 63 which is drivingly-coupled to the hydraulic pump 61. Secured to and depending from the outer end portion of plate member 62 is a hydraulic fluid reservoir 65, the pump intake conduit, shown at 66, extending into the reservoir 65 and having an open end terminating adjacent the bottom of the reservoir, as shown in FIGURE 2.

Mounted on the outer vertical wall of reservoir 65 is a "four-way open-center" control valve 67 of generally conventional construction having an operating handle 68. The control valve 67 comprises a cylinder containing a plunger having spaced apertured piston segments 69 and 70, with an open relieved portion 71 therebetween. Opposed, spaced pairs of conduits 72, 73 and 74, 75 are connected to the intermediate portion of the casing of valve 67. The upper piston element 69 is formed with transverse passages registrable with and adapted to connect conduit 72 to conduit 74 and conduit 73 to conduit 75 when the valve plunger is moved downwardly to its limiting position, as shown in FIGURE 7, providing direct communication between conduits 72 and 74 and conduits 73 and 75. The other piston segment is formed with reversing passages arranged to connect conduit 72 to conduit 75 and conduit 73 to conduit 74 when the valve plunger is moved upwardly, as viewed in FIGURE 7, to its limiting position, thus reversing the connections of the above-mentioned pairs of conduits. Conduit 72 is connected to the outlet port of pump 61 and conduit 73 is connected to the top portion of reservoir 65 to provide a return of hydraulic fluid to said reservoir. A conventional bypass relief valve 76 is connected across conduits 72 and 73.

As shown in FIGURE 7, the lower ends of cylinders 24 and 25 are connected by conduits 77, 77 to conduit 74. The upper ends of cylinders 24 and 25 are connected by conduits 78, 78 to the conduit 75 which includes a conventional one-way restriction valve 79, including a check valve 80 and a conduit restriction 81 connected in parallel, as shown in FIGURE 7. Hydraulic fluid is thus allowed to flow freely in an upward direction, as viewed in FIGURE 7, through the conduit 75 to the conduits 78, 78, but flow of the hydraulic fluid in the opposite direction must take place through the restriction 81, so that such flow is considerably retarded.

Obviously, any other type of one-way restriction valve assembly may be employed in place of the specific assembly 79 diagrammatically illustrated in FIGURE 7.

In operation, assuming the locking bars 54, 55 to be in retracted unlocking positions, the frame 38 may be elevated by moving the plunger assembly of the control valve 67 in an upward direction to its limiting position, as viewed in FIGURE 7, whereby conduit 72 is connected to conduit 75 and conduit 74 is connected to conduit 73. Thus, the pressure fluid from pump 61 passes through conduit 75, check valve 80 and conduits 78, 78 into the top portions of cylinders 24, 25, forcing their pistons downwardly and causing the pulleys 32, 33 to be lowered. At the same time hydraulic fluid from the lower portions of cylinders 24, 25 is allowed to flow back to the reservoir 65 through conduits 77, 77, 74, plunger element 70, and conduit 73. The lowering of the pulleys 32, 33 causes upward force to be applied to the respective corner portions of the automobile supporting frame 38 in the manner above-described. The frame may be locked in elevated position by operating the handle 60, 60 to move the locking bars 54, 55 outwardly into locking engagement with apertures 58, as above-described.

After the frame 38 has been elevated to the desired position, the valve assembly 67 may be operated to move its plunger into the intermediate position thereof shown in FIGURE 7, wherein the open center portion 71 is placed in communication with conduit 72, 73. This allows the pressure fluid from the pump 61 to be returned directly to the reservoir 65.

When it is desired to lower the frame 38, the handles 60 are operated to retract the bars 54, 55 so as to disengage them from their locking apertures 58, and the control valve assembly 67 is operated to move the plunger 69 downwardly to its limiting position, as viewed in FIGURE 7, to connect conduit 72 to conduit 74 and conduit 73 to conduit 75. The pressure fluid is thus admitted into the bottom portions of cylinders 24, 25 by way of conduit 72, piston segments 69, conduit 74 and the respective conduits 77, 77. At the same time the conduits 78, 78 connect the upper portions of the cylinders 24, 25 to the reservoir 65 through the restriction 81, conduit 75, valve plunger segment 69 and conduit 73. Under these conditions, upward force is applied to the pistons and cylinders 24, 25 to elevate the pulleys 32, 33, but the hydraulic liquid in the upper portions of cylinders 24, 25 is retarded in its flow back to the reservoir 65 because of the restriction 81. Thus, the frame 38 descends at a relatively slow rate, under the combined force of the load thereon and the hydraulic pressure applied upwardly to the pistons in the cylinders 24, 25. The retardation of the return flow of the hydraulic liquid provides a sufficient braking effect to prevent sudden dropping of frame 38, whereby the descent of said frame takes place at a safe relatively gradual rate.

As will be readily apparent, the operating handle 68 is normally in a horizontal neutral position, as shown in FIGURE 1. By rotating the handle 68 in either of two directions, the operating valve plunger assembly 69 can be correspondingly moved in either one direction or the other, for example, in the direction required to elevate the frame 38, or in the opposite direction, for lowering said frame in the manner above-described. It will be readily apparent that in the neutral position of the control handle 68, the open center portion 71 of the control piston assembly 69 connects conduit 72 to conduit 73 in the manner above-described, allowing direct return of the pressure fluid from pump 61 to reservoir 65.

Under operating conditions, excessive build-up of hydraulic pressure in conduit 72 is prevented by the provision of the relief bypass valve 76 which opens at an upper safe limiting value of hydraulic pressure and allows the excess pressure fluid to be bypassed to the return conduit 73 and to thus be returned to the reservoir 65.

While a specific embodiment of an improved automobile lift device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An automobile lift device comprising four stationary upstanding hollow vertical post members spaced to define a rectangular enclosure to receive an automobile, a supporting frame slidably-connected to said post members, respective single pulleys journaled in the top portions of the two post members at the forward end of the enclosure, a tubular tie rod connecting the top ends of the two post members at the rear end of the enclosure, a shaft extending axially through the tubular tie rod and supportingly secured in the top ends of the rear post members, respective top double pulleys journaled on the shaft in the top ends of the rear post members, respective depending hydraulic cylinders in said rear post members pivoted at their top ends in the top portions of said rear post members below said double pulleys, said cylinders having downwardly extensible piston rods, respective bottom double pulleys journaled to the bottom ends of the piston rods, respective first cables secured to the top ends of the cylinders, extending around said bottom double pulleys, said top double pulleys, and being connected to the supporting frame adjacent the rear post members, respective second cables secured to the top ends of the cylinders, extending around said bottom double pulleys, said top double pulleys, extending longitudinally towards said front post members and around said single pulleys, and being connected to said supporting frame adjacent said front post members, and hydraulic pump means operatively connected to the hydraulic cylinders.

2. The automobile lift device of claim 1, and wherein said hydraulic pump means is mounted on the top of one of the post members at said rear end of the enclosure.

3. The automobile lift device of claim 2, and wherein said hydraulic pump means comprises a hydraulic pump, an electric motor drivingly-connected to said pump, a reservoir, and conduit means including a control valve connecting said pump, cylinders and reservoir in a fluid circuit.

4. The automobile lift device of claim 3, and wherein said conduit means includes one-way fluid-retarding means in the portion of the fluid circuit leading from the cylinders to the reservoir.

5. The automobile lift device of claim 4, and wherein said supporting frame comprises a pair of parallel longitudinal wheel-supporting members and a pair of crossbars connecting said wheel-supporting members at the opposite ends of said enclosure, the ends of the crossbars having means slidably-embracing the post members.

6. The automobile lift device of claim 5, and respective pairs of outwardly-extensible horizontal bolt members slidably-mounted on the crossbars and being lockingly-engageable with the adjacent post members, and respective rotatable crank members pivoted to the crossbars and being drivingly-connected to the inner ends of the associated pairs of bolt members.

References Cited

UNITED STATES PATENTS

| | | | |
|---|---|---|---|
| 2,235,246 | 3/1941 | Anthony | 187—8.59 |
| 2,573,587 | 10/1951 | McGraw | 254—144 |
| 3,078,961 | 2/1963 | Powell | 187—8.59 |
| 3,314,657 | 4/1967 | Prud' Homme | 254—189 |

FOREIGN PATENTS

| | | |
|---|---|---|
| 1,183,686 | 10/1957 | France. |
| 590,501 | 4/1959 | Italy. |

EVON C. BLUNK, *Primary Examiner.*

H. C. HORNSBY, *Assistant Examiner.*